United States Patent [19]

Zouzoulas et al.

[11] Patent Number: 5,059,778

[45] Date of Patent: Oct. 22, 1991

[54] PORTABLE DATA SCANNER APPARATUS

[75] Inventors: John Zouzoulas, West Chester, Pa.; Louis J. Frontino, Cherry Hill, N.J.

[73] Assignee: Mars Incorporated, McLean, Va.

[21] Appl. No.: 913,215

[22] Filed: Sep. 29, 1986

[51] Int. Cl.$^5$ .............................................. G06K 7/10
[52] U.S. Cl. ...................................... 235/472; 382/59
[58] Field of Search .......................... 235/472; 382/59

[56] References Cited

U.S. PATENT DOCUMENTS

| | | | |
|---|---|---|---|
| 3,685,723 | 8/1972 | Berks | 235/472 |
| 4,057,784 | 3/1977 | Tafoya | 340/146.3 F |
| 4,093,865 | 10/1978 | Nickl | 250/568 |
| 4,095,095 | 8/1978 | Muraoka et al. | 235/419 |
| 4,118,687 | 7/1978 | McWaters et al. | 340/146.3 ED |
| 4,128,298 | 7/1978 | McMillan | 359/96.10 |
| 4,158,194 | 4/1979 | McWaters et al. | 340/146.3 SY |
| 4,251,798 | 10/1981 | Swartz et al. | 340/146.3 SY |
| 4,354,101 | 3/1982 | Hester et al. | 235/463 |
| 4,360,798 | 3/1982 | Swartz et al. | 340/146.3 AG |
| 4,369,361 | 5/1983 | Swartz et al. | 235/470 |
| 4,387,297 | 4/1983 | Swartz et al. | 235/462 |
| 4,409,470 | 7/1983 | Shepard et al. | 235/472 |
| 4,445,028 | 4/1984 | Huber | 235/472 |
| 4,460,120 | 1/1984 | Shepard et al. | 235/472 |
| 4,467,196 | 10/1984 | Balliet et al. | 250/227 |
| 4,471,218 | 9/1984 | Culp | 235/472 |
| 4,538,060 | 8/1985 | Sakai et al. | 235/472 |
| 4,570,057 | 4/1986 | Chadima, Jr. et al. | 235/472 |
| 4,603,262 | 5/1986 | Eastman et al. | 250/566 |
| 4,621,189 | 7/1986 | Kumar et al. | 235/472 |
| 4,678,288 | 7/1987 | Lonsdale | 235/472 |
| 4,694,182 | 9/1987 | Howard | 235/472 |
| 4,758,717 | 7/1988 | Shepard et al. | 235/472 |

FOREIGN PATENT DOCUMENTS 2537426 3/1977 Fed. Rep. of Germany ...... 235/472
1252108 11/1971 United Kingdom ................ 235/472

OTHER PUBLICATIONS

International Publication No. WO87/07106, Ronald E. Zook, "Portable Handheld Terminal Including Optical Bar Code Reader and Electromagnetic Transceiver Means for Interactive Wireless Communication with a Base Communication System", 11/19/87.
Federal Express ad, 1986 Federal Express Corporation.
"Bar Codes Keep Factories on Track", *High Technology*, Jul./1986, Peter C. Doyle.
"Our Versatile New Hand-Held Bar Code Reader Boosts Efficiency", SRD Corporation, *Electronics*, May 17, 1984, p. 62, Ad.

*Primary Examiner*—A. D. Pellinen
*Assistant Examiner*—Jeffrey A. Gaffin
*Attorney, Agent, or Firm*—Davis, Hoxie, Faithfull & Hapgood

[57] ABSTRACT

The present invention provides an integrated self-contained portable data scanner apparatus which is suitable for long periods of uninterrupted handheld use for purpose such as the bar code scanning of inventory. The apparatus includes a number of modules interconnected into a self-contained unit with no external cabling necessary. The basic modules are a scanner module, a data module including one or more data processing components such as a keyboard, a display or a microprocessor, and a removable rechargeable power module.

59 Claims, 6 Drawing Sheets

PORTABLE DATA SCANNER APPARATUS

FIELD OF THE INVENTION

The present invention relates generally to an integrated, self-contained handheld data scanner apparatus and particularly such apparatus for non-contact scanning of data and bar code symbols over a range of focal distances. The apparatus includes a rechargeable battery pack, a laser scanning element and a data module in an integrated unit which is compact, rugged and lightweight, and operates to scan and decode a variety of bar codes with a range of densities and formats.

DESCRIPTION OF THE PRIOR ART

Bar code symbols consisting of a strip of alternating dark bars and light spaces, and bar code scanners for reading bar codes, have become widely used in many industries for a variety of tasks. For example, one large overnight package delivery service has recently advertised the use of bar codes and a handheld bar code scanner for purposes of computerized tracking of the location of packages from their time of pickup until their delivery.

Currently existing bar code scanners fall into several categories. For example, optical wands of both the contact and non-contact variety are well known. See, e.g., U.S. Pat. Nos. 4,471,218, 4,467,196, 4,354,101, 4,158,194 and 4,118,667. The typical bar code reading wand is a pen-like device having a light source and photodetector located in its tip. The tip of the wand is either rubbed in contact with or waved in close proximity to the bar code symbol. The photodetector senses changes in the reflectance of the symbol as the tip crosses the dark bars and light spaces of the symbols. Typically, the bar code symbol to be scanned must be located at a fixed focal distance.

Similarly, stationary laser scanning reading arrangements, in which the bar code symbol is brought to and passed through the area in which a laser beam is focused, are also well known. See, e.g. U.S. Pat. Nos. 4,095,095, 4,093,865 and 4,057,784. These units, as well as units such as the portable desk top laser scanning workstation described in U.S. Pat. No. 4,369,361, have a wider range of focal distances at which they are operable than the typical bar code reading wands. They are well adapted to operation in applications such as the checkout counter at a grocery or retail store, but are not suitable for handheld usage, in which the bar code scanner must be repeatedly moved to the location of the bar code symbols to be scanned.

Finally, various handheld laser scanner arrangements with varying degree of portability are known. See, e.g., U.S. Pat. Nos. 4,460,120, 4,409,470, 4,387,297, 4,360,798 and 4,251,798. U.S. Pat. No. 4,251,798, for example, describes a portable scanning head having a carrying handle, a keyboard, and first and second displays. This portable scanning head is electrically connected to a console by an electrical cable, and is designed for reading barcodes such as those found on the grocery products found in grocery stores. The portable scanning head includes a resilient contact pad which contacts and conforms to the surface on which the bar code symbol to be scanned is imprinted.

SUMMARY OF THE INVENTION

While the prior art addresses a host of problems related to bar code scanning, it does not adequately address the problems faced when it is more desirable to take the bar code scanner within reasonable proximity to the bar code to be scanned rather than bringing the bar codes in close proximity to the bar code scanner. For example, for inventory control where the inventory consists of thousands of boxes stacked in a warehouse, a lightweight, simple to use and completely self-contained unit is highly desirable. The present invention addresses the problems faced in such environments.

Briefly, the present invention provides a modular integrated self-contained apparatus. In one embodiment, the invention apparatus comprises a handheld data scanner apparatus for scanning and reading data including bar codes and other data comprising three modules. The first module comprises a first module base of elongate shape having first and second ends, a housing, means located within the housing for projecting a scanned light beam in the direction beyond the first end of the first module base with the central axis of the scanned light beam in generally the same plane as the major axis of the module base. The apparatus further comprises means for detecting light from the scanned light beam which has been reflected from scanned objects and producing a first electrical signal representative of the detected light. The second module comprises a data module containing one or more data processing components. This second module is attached to and generally orthogonal to the first module base near the first end thereof. The third module of elongate shape is attached to and generally orthogonal to the first module near the second end thereof.

In a second embodiment, the apparatus is preferably an integrated self-contained laser scanner apparatus. The first module includes a scanner having a laser diode and optical scanning elements for illuminating and detecting a variety of bar codes with a range of densities and formats. The second module incorporates a keyboard and display to allow the operator to control the decoding process, and includes a large solid state memory for storage of data such as data generated by a number of successive bar-code decodings and for storage of operating and application programs. Finally, the third module is a strong and lightweight frame which may be removably attached to a rechargeable battery pack carefully placed to insure user comfort. The three modules are connected and cooperate so that the apparatus is satisfactory for long periods of uninterrupted handheld use in a variety of environments.

Additional details, features and advantages of the present invention are clear from the drawings, and the detailed discussion below.

DETAILED DESCRIPTION

Figure 1:
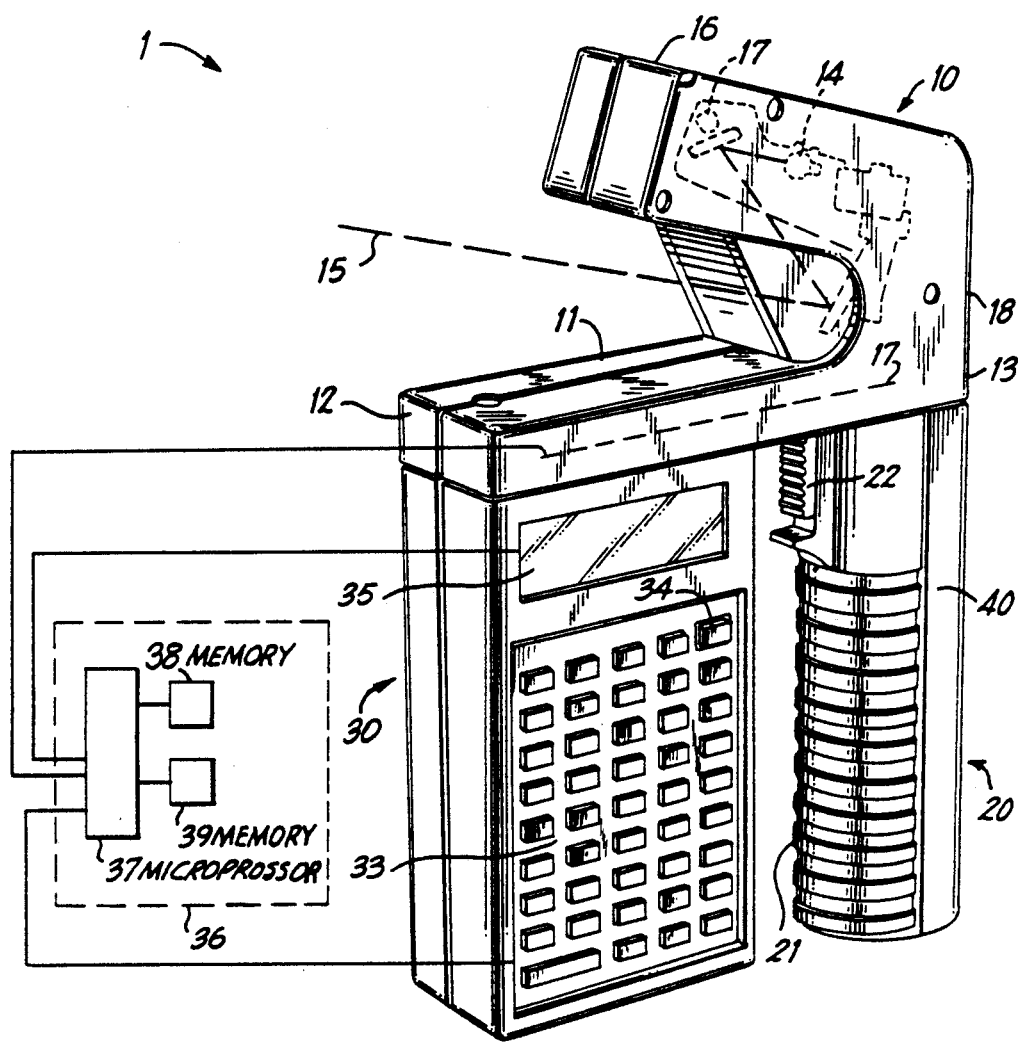
FIG. 1 is a front view of a first embodiment of a handheld light scanner apparatus according to the present invention.
Figure 1A:
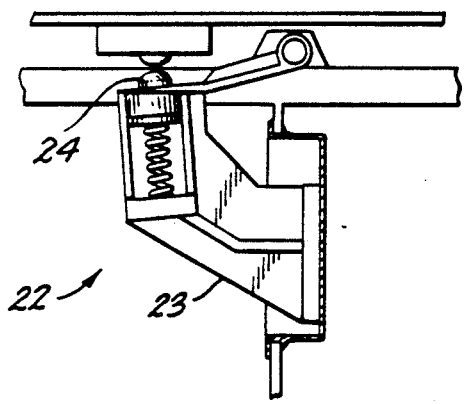
FIGS. 1A–F illustrate details of the trigger of both the first and the second embodiment.
Figure 1B:
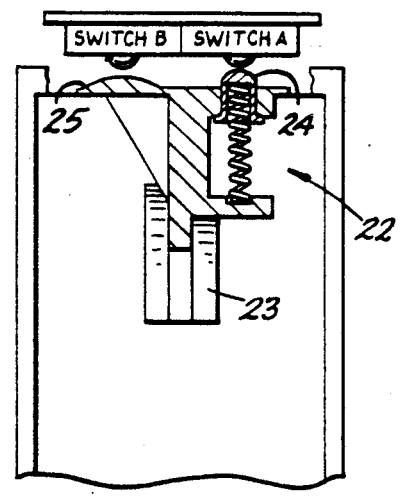
Figure 1C:
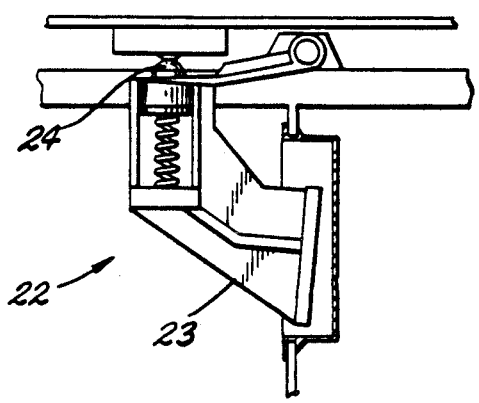
Figure 1D:
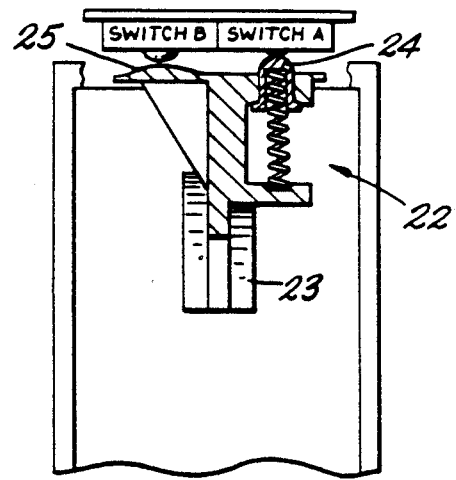
Figure 1E:
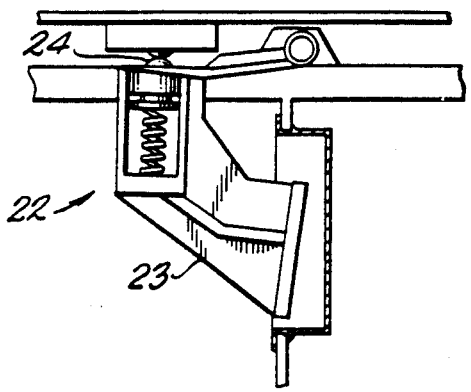
Figure 1F:
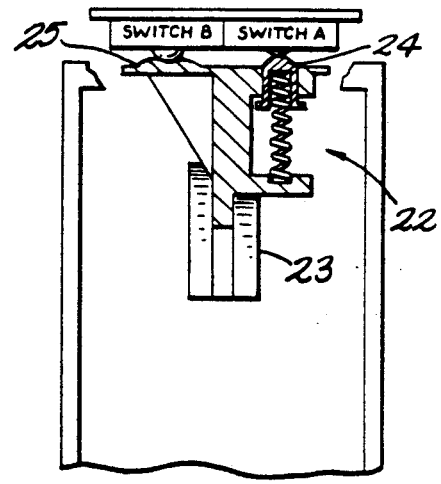

FIG. 1 illustrates a handheld bar code scanner apparatus according to the present invention.

Apparatus 1 includes a first module 10 having an elongate base 11 with first and second ends 12 and 13 respectively, and an upper portion 16. The first module 10 further includes means 14 located within the housing of module 10 for projecting both a scanned reading light beam and a scanned aiming light beam in the direction beyond the first end 12 of base 11 with the central axis 15 of the scanned light beam lying generally parallel the major axis of upper portion 16. The module 10 also includes a visual indicator 18 such as a light emitting diode (LED) display for providing visual feedback that data has been successfully decoded. Apparatus 1 also includes means 17 for detecting light from the scanned reading light beam which has been reflected from scanned objects and producing a first electrical signal representative of the detected light.

The first module 10 is attached to a second module 30 comprising a data module including one or more data processing components, such as a keyboard 33, a display means 35, or a microprocessor 37. The keyboard 33 includes an on-off switch 34. As shown in FIG. 1, second module 30 is attached to first module 10 generally orthogonal to the first module base 11 near the first end 12.

First module 10 is also attached to a third module 20. The third module 20 is elongate in shape and attached generally orthogonal to base 11 near the second end 13 of base 11. As shown in FIG. 1, the third module 20 comprises the handle for the apparatus 1 and includes a handgrip 21. Third module 20 is sufficiently spaced from second module 30 to allow the operator's fingers to pass freely between them. A three position trigger 22 is provided for the operator's use in controlling operation of the apparatus 1. As illustrated in FIGS. 1A, 1B, 1C, 1D, 1E and 1F, the operation of trigger 22 is briefly as follows. In a first position illustrated in FIGS. 1A and 1B, trigger 22 is in its rest position. A trigger button 23 includes a spring loaded activating button 24 and a fixed activating button 25 opposed to switches A and B respectively. In the first position, neither switch A nor switch B is closed. When the operator squeezes the trigger 22 to a second position illustrated in FIGS. 1C and 1D, the spring loaded activating button 24 closes switch A, but the fixed activating button 25 does not close switch B. As the operator further depresses the trigger 22 to a third position illustrated in FIGS. 1E and 1F, the spring loaded activating button 24 continues to maintain switch A closed and the fixed activating button 25 now closes switch B.

A removable battery pack 40 is also located within the module 20. Battery pack 40 supplies normal operating power for the apparatus 1.

The overall operation of apparatus 1 is briefly as follows. To aim the apparatus 1, the operator points the upper portion 16 of first module 10 in the direction of the target to be scanned. Then, he depresses trigger 22 part way to the second position. This second position energizes means 14 to produce the aiming light beam which provides him with a basis for seeing when proper alignment with the symbol to be scanned has been achieved. After the apparatus 1 is properly aligned, the operator further depresses trigger 22 to the third position thereby energizing the means 14 to cause the aiming light beam to scan and to cause the projection of the scanned reading light beam.

The reflected portion of the scanned reading light beam is detected by the means 17 for detecting light, and then means 17 produces an electrical signal representative of the detected light. The electrical signal is preferably converted to a digital signal and connected as an input to a data processor 36 located in the second module 30 but shown for purposes of illustration in FIG. 1 in block diagram form outside the second module 30. Data processor 36 includes a microprocessor 37, RAM memory 38 for data or program storage and ROM memory 39 for storage of a fixed operating program for control of microprocessor 37. Microprocessor 37 is also connected to the means 17 for detecting reflected light and producing an electrical signal, as well as, to the keyboard 33 and the display 35. The digital signal is processed and decoded by data processor 36. The decoded data is stored in RAM memory 38. Typically, microprocessor 37 is programmed so that signals are produced to cause data decoded from the digital signal to be displayed on the LCD display 35 and cause the visual feedback LED 18 to be illuminated indicating that reading has been successfully accomplished.

The present invention is directed to the integration of a number of modules into a self-contained portable apparatus. While in both the first embodiment described above and in the second embodiment described below, a presently preferred placement of individual components such as the keyboard 33, display 35, microprocessor 37 and the memories 38 and 39 within these modules is described, it should be recognized that these individual components may be otherwise distributed within the modules. Further, while it is preferred that the apparatus scan automatically, it should be recognized that scanning can be accomplished by manually moving a steady beam. Finally, apparatus according to the present invention is also suitable for reading a light data signal so long as the data is encoded in a bar code format so that the light data signal emulates the reflected light which would be seen reflected from a printed bar code.

The presently preferred embodiment is illustrated in FIGS. 2-10. Those figures illustrate an integrated self-contained laser based bar code scanner apparatus 50. This self-contained apparatus 50 is rugged, compact, lightweight and intended for long periods of uninterrupted handheld use for noncontact barcode scanning over a range of focal distances in a variety of environments. These characteristics are necessary because it is expected that apparatus according to the present invention will be carried by the operator to various locations. Further, the apparatus eliminates interconnecting cables and belt mounted components. Consequently, the repetitive scanning of bar codes with the present apparatus can be a one-handed operation allowing the other hand free for other functions.

The self-contained apparatus 50 includes a number of modules: a scanner module 100, a frame module 200, a data module 300, including one or more data processing components, and a removable, rechargeable battery module 400 combined to achieve the beneficial result of true portability in a single integrated unit without power or data transfer cabling to separate power packs or data processing apparatus.

Turning to the details of the various modules and their arrangement and connection according to the present invention, first each of the modules will be briefly discussed, the details of their interconnection into a unit, and then the operation of the unit will be discussed.

Scanner Assembly

Figure 3:
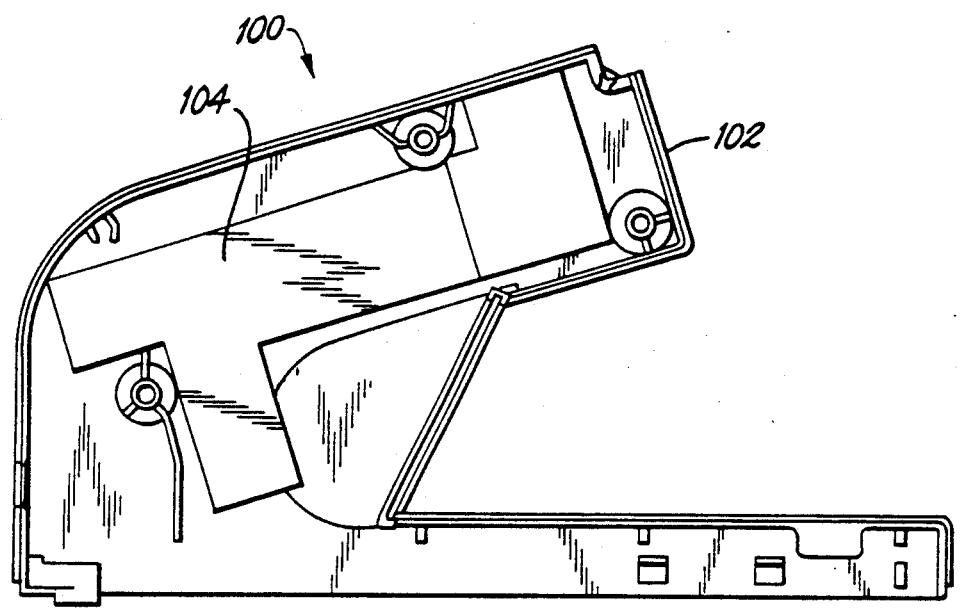
FIG. 3 is a detailed drawing of the front scanner housing of the integrated laser scanning apparatus of FIG. 2.
Figure 4:
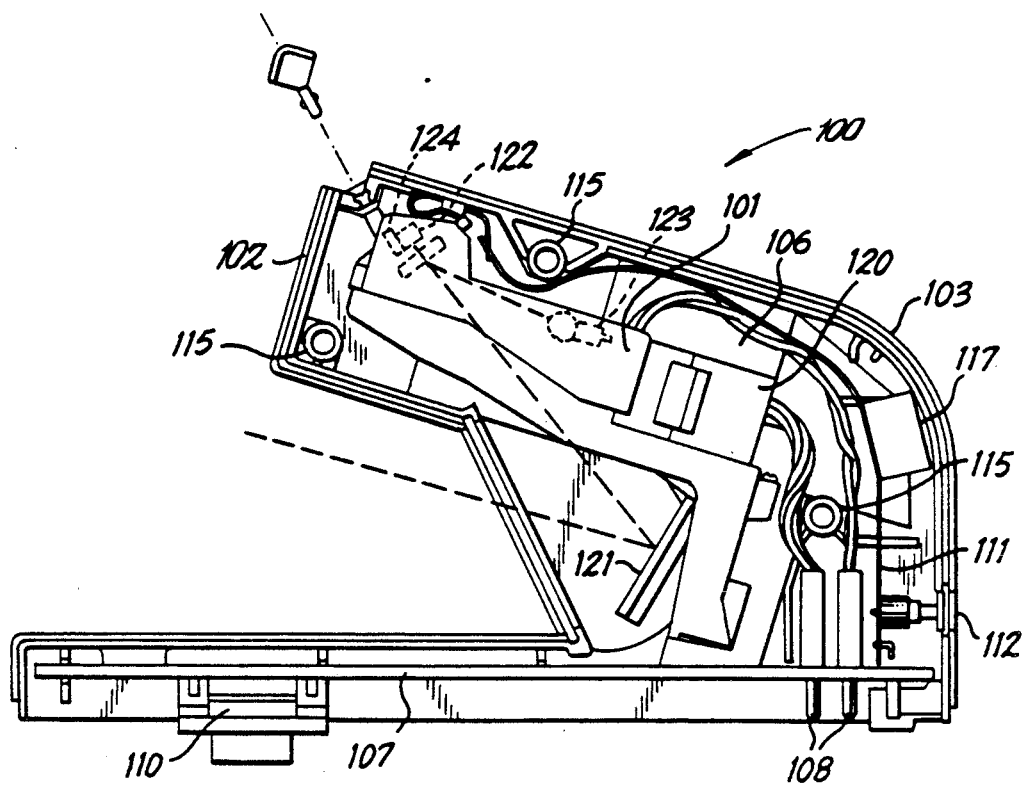
FIG. 4 is a detailed drawing of the back scanner housing along with the scanning module and other components making up the scanner of the apparatus of FIG. 2.

FIGS. 3 and 4 illustrate the details of the scanner module 100. As illustrated in FIGS. 3 and 4, scanner module 100 includes a laser scanner assembly 101 (FIG. 4). Assembly 101 includes the necessary components for generating a scanning laser bar code reading signal and an aiming signal, and for detecting the reflected portion of the reading signal. It should be noted that certain prior art laser scanners employed a readily visible laser beam which was used both for aiming and for scanning. The present use of a separate aiming signal is the equivalent of the prior art aiming teaching, and only desirable if a laser diode is used which does not produce a readily visible beam.

Module 101 preferably includes a laser diode source 122 of coherent light and optionally a high intensity light emitting diode (LED) source 123 of visible light. Both the laser diode 122 and the LED 123 direct their light outputs along optical paths to a scanning mirror 121 which directs light out, of the apparatus 50 and causes it to scan in a narrow arc back and forth across a bar code located at some distance from the apparatus. The scanning process is activated by a three position trigger switch 203 (shown in FIG. 5). Trigger 203 preferably is constituted and operates as shown in FIGS. 1A-1F, its first position is off. The second trigger position activates the LED 123 and causes a visible spot to appear where the unit is aimed. When properly aimed, the visible spot will appear on the bar code to be read. This step assists the operator in the proper orientation and aiming of the unit. The third trigger position activates the laser diode 122 and a mirror driver 120 such as a motor which drives the scanning mirror 121, thereby commencing scanning and the beginning of the actual process of bar code reading. During scanning, the laser beam is reflected or absorbed by the alternating pattern of bars and spaces in the bar code. A portion of the reflected light returns to the apparatus 50 and is optically directed to a photodetector 124 which converts the varying light into an analog electrical signal. This signal is amplified, processed, converted to a digital electrical signal and transferred to a microprocessor contained in the data module 300 just as microprocessor 37 is contained within data module 30 of FIG. 1.

The scanner assembly 101 is housed between a front housing 102 (FIG. 3) and a back housing 103 (FIG. 4). The particular details of the scanner module used are not the subject matter of the present invention. Consequently, they are not described further. It will be understood that any suitable lightweight module for producing a laser reading signal might be used in conjunction with the present invention.

The presently preferred construction of housings 102 and 103 is molded plastic. The module 101 is a precision optical instrument which must be isolated from physical harm which would damage it or disturb the proper alignment of its components. Because the scanner module 101 is susceptible to damage or disturbance from externally derived shock, vibration and the like, the presently preferred technique for mounting module 101 is to sandwich it between two pieces of shock absorbing packaging 104 (FIG. 3) and 106 (FIG. 4) which are placed in the front and back housings respectively as shown in FIGS. 3 and 4. The two pieces 104 and 106 are preferably pieces of molded medium density polyurethane foam.

The housings 102 and 103 also enclose a scanner control circuit board 107 which includes circuitry for amplifying and translating the analog electrical signal produced by the photodetector 124 into digital data and for controlling the scanner assembly 101. This digital data is transferred to the data module 300 where it is processed and stored.

Also included in the scanner module 100 are an audible indicator 117 such as a beeper to provide audio feedback, and a visual indicator 112, which is preferably an LED, to provide visual feedback to the operator that the data has been successfully decoded.

All of the functions of the scanner module 100 are controlled by a microprocessor located within the data module 300 and not shown. Scan activation, illumination source selection and activation, received signal analysis, and audio/visual feedback activation are all controlled by this microprocessor. Also, DC power to the scanner 100 is switched on and off by power control circuits in the data module 300.

To avoid the inclusion of additional loose wiring, a flex board connector 111 connects the scanner module 101, the visual indicator 112 and audible indicator 117 to the scan control board 107.

The scanner module 100 is connected to the frame module 200 as will be discussed below in connection with the detailed discussion of frame module 200.

Frame Module

Figure 7:
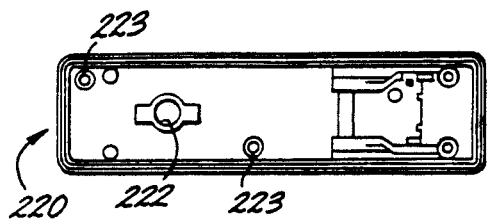
FIG. 7 is a top view illustrating the details of the top of the frame of FIG. 3.
Figure 5A:
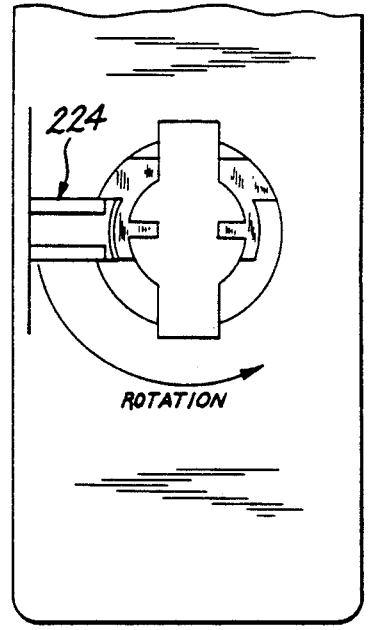
FIGS. 5A and 5B are partial underside views of the top of the frame of FIG. 5.
Figure 5:
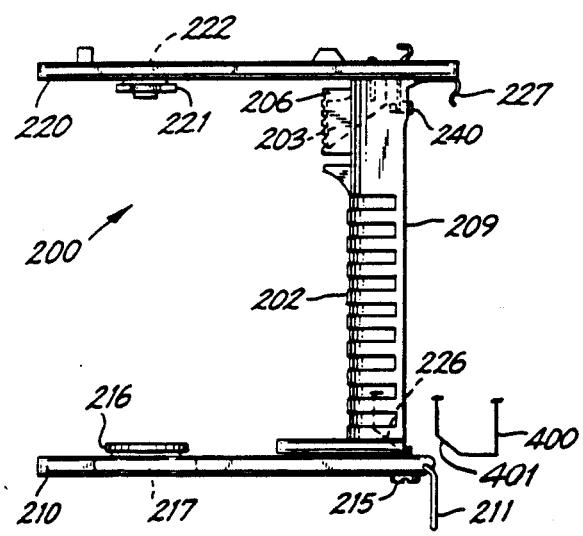
FIG. 5 is a front view detailed drawing of the frame of the integrated laser scanning apparatus of FIG. 2.
Figure 6:
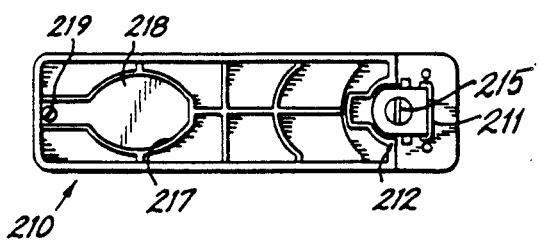
FIG. 6 is a bottom view illustrating the details of the frame of FIG. 3.

The details of the frame module 200 are illustrated in FIGS. 5-7 As shown in FIG. 5, frame 200 is in this embodiment preferably a C-shaped unit having a body 201, a base 210 and a top 220. Preferably, the body 201 includes a number of molded grooves and ridges defining a handle grip 202, and a molded cavity 209 contoured for receiving the battery module 400.

Figure 2:
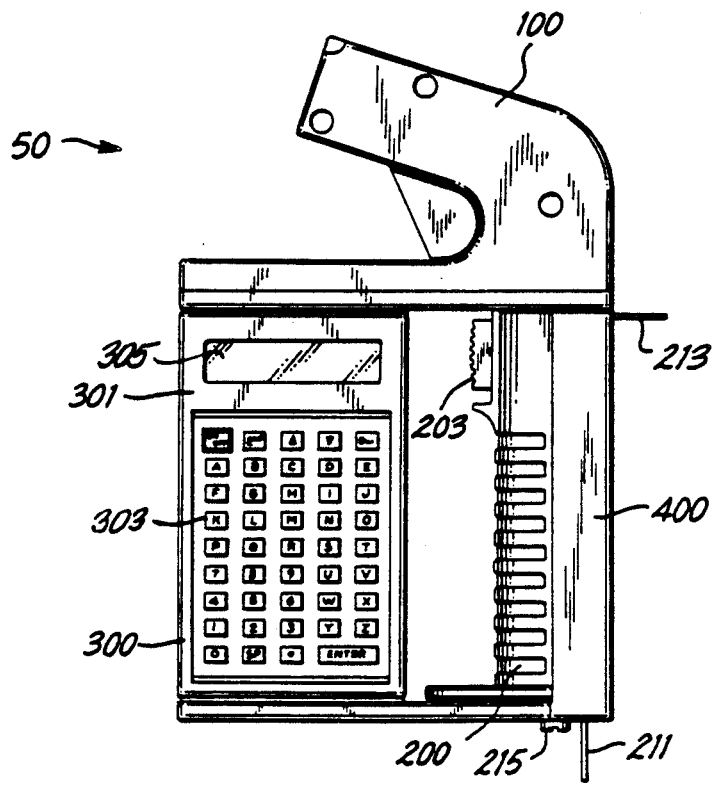
FIG. 2 is a front view of a second embodiment illustrating an integrated laser scanning apparatus according to the present invention.

Body 201 also includes an upper ring clip 213 which is best seen in FIG. 2. Ring clip 213 provides the operator with a ready means to clip the unit to a wrist or shoulder strap or secure it in some other way in situations in which apparatus 50 might accidentally be dropped where the operator needs to use both his hands for another task.

The base 210 of the frame 200 is seen in FIG. 6. It is preferably constructed of molded plastic having reinforcing ribs to increase its strength. Base 210 includes a lower ring clip 211 (best seen in FIG. 2) which serves the same purpose as clip 213. Ring clip 211 is held in a ring clip seat 212 when not in use. Base 210 further includes a capture screw 215 which secures battery module 400 in place during normal operation.

Also, base 210 includes an opening. Opening 217 passes through base 210 and allows data and power, or data or power as desired to be connected from the data module 300 through the base 210 to whatever additional accessory it is desired to connect to the self-contained apparatus 50. Alternatively, opening 217 may be used to allow the connection of the self-contained apparatus 50 to a modem or directly to a central processing unit for purposes of downloading information from the apparatus 50, or for purposes of transferring information to the apparatus 50. As shown in FIG. 6, the opening 217 is filled with a plug 218 which is held in place by a screw 219. The plug 218 seals the base of data module 300 from dirt, moisture and the like.

Finally, as will be described in greater detail below, base 210 also preferably includes a molded lower collar 216 which surrounds the opening 217 and extends orthogonally upwards from the base 210. Along with an upper collar 221 which extends downwardly from top 220, the lower collar 216 provides a circular bearing surface which mates with semicircular surfaces in the top and bottom of the front housing 102 of the data module 300. Clamps 306 and 307 shown in FIG. 8 also mate with collars 221 and 216. This assembly allows data module 300 to be readily rotatably mounted between the base 210 and top 220. It is desirable that the data module 300 be rotatably mounted, so that the apparatus 50 may be easily used by both righthanded and lefthanded operators.

Figure 5B:
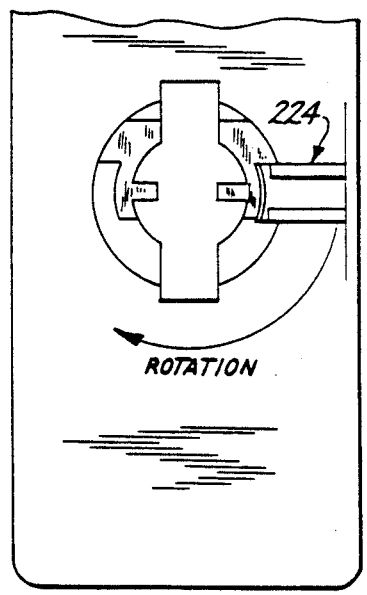

FIG. 7 shows that top 220 of the frame 200 includes the upper collar 221 which surrounds an upper opening 222 for electrical connection of the data module 300 and the scanner module 100. Top 220 also includes a pair of detent holes 223 which are used in conjunction with a detent button 309 (shown in FIG. 9) to secure data module 300 in either of two operational positions suited to lefthanded or righthanded usage. The electrical cable connecting data and power from the scanner module 100 and the battery module 400 respectively to the data module 300 twists as the data module 300 rotates. In order to prevent damage to the cable and the connectors which it connects, mechanical stop 224 shown in FIGS. 5A and 5B prevents data module 300 from being rotated in excess of approximately 180°.

Data Module

Figure 8:
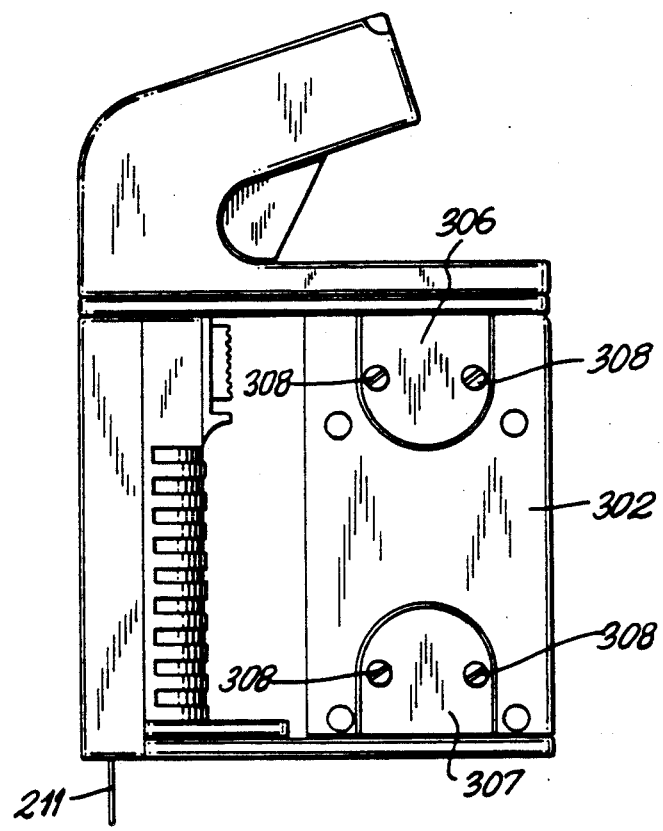
FIG. 8 is a rear view of the integrated laser scanning apparatus of FIG. 2.

Having discussed the scanner module 100 and the frame module 200, the details of data module 300 are next discussed. The front of data module 300 is shown in FIG. 2. Data module 300 preferably includes a keyboard 303 such as an elastomer keypad for the entry of data or commands. The data module 300 displays data on a display 305 which is preferably an LCD display for low power operation. The electronic circuitry of data module 300 is contained within an outer housing formed by the connection of a front housing 301 (FIG. 2) and a back housing 302 (FIG. 8). The data module 300 is secured to frame 200 by upper and lower clamps 306 and 307 (shown in FIG. 8). The clamps 306, 307 include a pair of semicircular cutouts which fit over the collars 216 and 221. Four screws 308 secure the clamps 306 and 307 to data module 300 rotatably in place between the base 210 and the top 220 of the frame 200.

Figure 9:
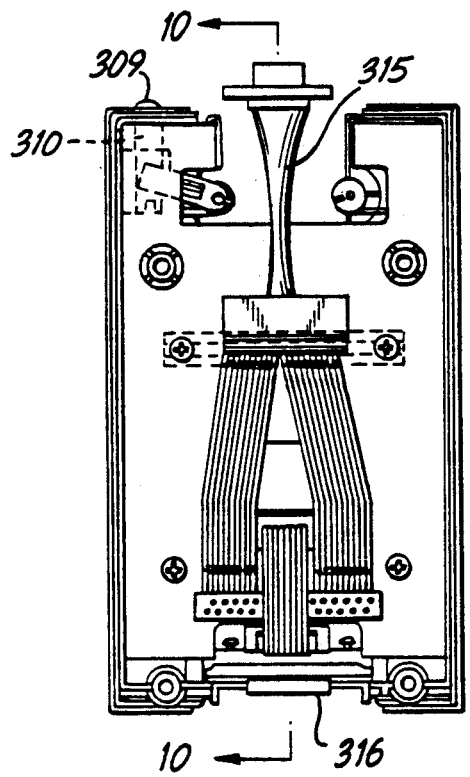
FIG. 9 is a detailed drawing of the data module of the integrated laser scanning apparatus of FIG. 2.

As illustrated in FIG. 9, the data module 300 includes a detent button 309 which is spring mounted on a detent spring 310. Detent button 309 interacts with the detent holes 223 to hold data module 300 in place in the appropriate position.

Cable 315 connects the data module 300 to the scanner module 100. The cable 315 terminates in a connector plug 316 whose shape allows it to pass through the opening 222 and make connection with the electrical connector 110 mounted on the scan control board 107. The length of the connecting cable 315 is chosen to be long enough so that the cable 315 can readily be twisted approximately 180° without undue stress on the wires in the cable 315 or the connectors at either end of cable 315.

Turning to the base of data module 300, a connector 316 is provided. Connector 316 is the input or output port from data module 300.

Figure 10:
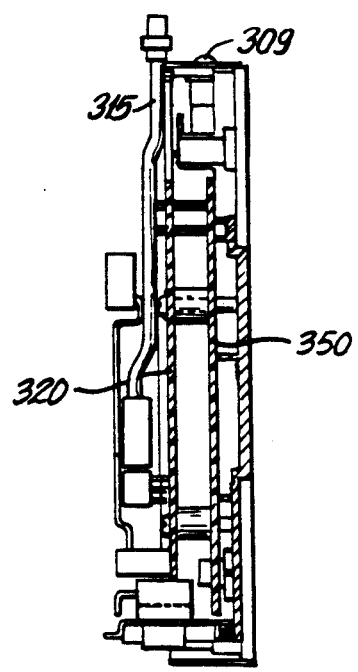
FIG. 10 is a section view along section line 10—10 of FIG. 9 of the data module.

The data module 300 provides the central control for the apparatus 50. While the present invention does not extend to the particular design of the electronics housed within the data module 300, module 300 preferably includes a microprocessor, a large read/write memory, and a non-alterable memory for storage of resident firmware. In the presently preferred embodiment, these components are mounted on two printed circuit boards: a control printed circuit board 320 (FIG. 10) and a memory printed circuit board 350 (FIG. 10). It is presently preferred to use CMOS logic chips which are surface mounted on the board 320 using SMD techniques. The display 305 and keyboard 303 are provided to allow operator control of the apparatus 50 and to provide visual presentation of data or commands to the operator.

In its simplest form, the unit's microprocessor executes the code of a resident microprocessor control program. Typical functions performed under program control are:

a. Interface to activating trigger 203 and laser scanner assembly 101,
b. Bar code analysis, discrimination, and decoding,
c. Interface to the input/output port (RS 232) 316,
d. Command interpreter for program load,
e. Memory store for successive bar code reads,
f. Keyboard scanning, LCD display and real time clock housekeeping,
g. Low battery monitoring and generation of audible and visual feedback.

While operating in this mode, the data module 300 performs only basic operations and is in no way customized for specific user applications. However, the basic mode permits loading of a variety of application programs into the read/write memory of the data module 300 from an external device. Thereafter, the apparatus 50 will execute the code of the application program and will be personalized for its intended use by that program.

Because the apparatus 50 must be low in weight and must maintain its data with highest reliability a variety of power control functions are preferably implemented. On and off functions are semi-automatic. The scanner and data modules are powered via the trigger switch 203 as described above. The data module 300 alone can be powered up from its standby state by depressing the "ON/OFF" button on the front of the terminal. In the standby state, memory is maintained by power from battery module 400. Power to the data module 300 can be removed by depressing "ON/OFF" once again; however, if the data module 300 is powered and a sufficient period of inactivity follows, the apparatus 50 will power down automatically.

As mentioned above, data in memory is normally retained via the battery module 400 contained in the handle of frame 200. A small internal rechargeable NiCad battery, which is suited for trickle charge operation, is maintained charged by the battery module 400 and when module 400 is removed for charging, this small backup battery protects the data in memory. The backup battery typically provides standby protection of a minimum of two weeks of data integrity with the battery module 400 detached.

When the voltage of battery module 400 reaches a predetermined minimum value, a low voltage detector circuit interrupts the microprocessor. The microprocessor produces an output control signal which causes an audible alert to sound and the LCD display 305 will inform the operator of this status. The present scan will be completed, additional scans will be prevented, and apparatus 50 will power down automatically. The operator can then either replace the battery with a fresh one or recharge the present one.

Because the present invention is intended for long periods of uninterrupted handheld use, it has been designed to be lightweight and also to consume very low amounts of power. Consequently, low-power CMOS logic components are preferably used to conserve power. Also, data protection, low power, and power down circuits have been included as discussed above. Widespread use of surface mount design (SMD) is preferred to conserve space. Because the apparatus 50 is designed for uses such as inventory control in which data integrity is essential, data module 300 has been designed to include a rechargeable backup battery to provide power during the times in which rechargeable battery module 400 is being changed.

Battery Pack

Battery module 400 is shown in FIG. 2. The presently preferred battery module 400 includes six, rechargeable nickel-cadmium batteries connected in series to provide nominally 7.2 V DC to an input of a 5VDC voltage regulator so that a regulated source of 5VDC is provided for apparatus 50.

Module Interconnection and Overall Operation

The battery module 400 is connected to the frame module 200 as follows. These two modules connect in a manner that is both easy and which insures that good power connection is made. The contacts 240 located at the top of the body 201 are spring loaded and recessed so that they are protected from being bent or damaged. Opposing contacts pass through the body 201 and insure a good electrical connection to the contacts 108 shown in FIG. 4. Opposing tapered surfaces 226 and 401 in the base of the body 201 and in the battery module 400 respectively cause the contacts in frame 200 to make (upon insertion) or break (upon removal) connection with the contacts of the battery module 400 with a wiping action that tends to clean the contacts and insure a good electrical connection. An ear-shaped metal insert 227 applies pressure to hold battery module 400 in place, and capture screw 215 screws into a metal insert in the base of battery module 400 to lock the battery module 400 in place.

It should be noted that apparatus constructed according to the presently preferred embodiment will weigh approximately 28 ounces (0.57 kg). The heaviest portion of the apparatus 50 is the battery module 400. Apparatus 50 has been designed to place the heaviest part of the apparatus adjacent to the operator's hand, and so that the center of gravity of apparatus 50 is also proximate the user's hand to make the apparatus 50 comfortable for long periods of extended use by minimizing unwanted cantilevering effects. Additionally, the shape of apparatus 50 is designed to minimize the chances of an operator's dropping it when his hand is inadvertently opened or his grip is relaxed.

The front and back housings 102 and 103 of scanner module 100 are designed so that they snap together and are held together with screws at locations 115. A shock absorbing bumper piece 116 is also provided. The scanner module 100 is physically connected to the top 220 of the frame module 200 with screws.

The data module 300 is physically connected to the frame module 200, and electrically connected to the battery module 400 through the scanner control board 107.

The apparatus 50 is operated by aiming the unit 50 at a bar code to be read. To facilitate this aiming, the operator squeezes the trigger button into its second actuating position. An electrical signal is produced, and transmitted through scan control board 107 to the data module 300. This signal is detected by the microprocessor which produces an output control signal which is transmitted back through the scan control board 107 and which causes the aiming LED 123 to be illuminated. Next, the operator properly aligns the apparatus 50 with the bar code, and further squeezes the trigger 203 to the third position to initiate scanning.

Optical detection circuitry produces an analog electrical signal indicative of the portion of the laser beam reflected from the bar code being scanned. This analog electrical signal is converted to a digital electrical signal by the scan control board 107, and connected to an input of data module 300. This digital electrical signal is processed by the microprocessor which decodes the bar code based on the data contained therein. Once decoding has been completed, the decoded data is stored in memory. Additional functions may be provided by appropriate program control of the microprocessor.

Typically, the above operation is continued until it is time to download the accumulated data stored in the memory. At this point in time, the plug 218 is lifted from bottom 210 thereby exposing the connector 316 in the base of the data module 300. This connector 316 provides a standard RS 232 data port for connection to an external apparatus such as a modem or a central computer unit for rapid downloading of the data stored in the memory.

The connection 316 can also be used for entering custom application programs which the operator wishes to store in the memory to customize the apparatus 50 to his particular application.

We claim:

1. A handheld light scanning and detection apparatus comprising:
    a first module comprising a first housing of elongate shape having first and second ends, and means located within the first housing for projecting a light beam;
    means for detecting light from the scanned light beam which has been reflected from scanned objects and producing a first electrical signal representative of the detected light;
    a second module attached to the first module near the first end of the first housing, the second module comprising a second housing and one or more components of a data processing system which system is electrically connected to receive said first electrical signal; and a third module attached to the first module near the second end of the first housing, the third module comprising a third housing for one or more electrical components of the apparatus.

2. The apparatus of claim 1 in which the second module further comprises a keyboard.

3. The apparatus of claim 2 in which the second module further comprises a display means.

4. The apparatus of claim 1 in which the second module further comprises a display means.

5. The apparatus of any of claims 1 through 4 wherein the second module is moveable between two positions.

6. The apparatus of claim 5 further comprising means for rotation of the second module about an axis generally orthogonal to the first module base so that a surface of the second module can be turned to face either side of the first module.

7. The apparatus of claim 5 wherein the third housing is a handle for the apparatus.

8. The apparatus of claim 5 wherein the third module further comprises a battery located within the third housing.

9. The apparatus of claim 6 wherein the third housing is a handle for the apparatus.

10. The apparatus of claim 6 wherein the third module further comprises a battery located within the third housing.

11. The apparatus of claim 9 wherein a hand grip is molded on the exterior surface of the third housing.

12. The apparatus of claim 9 wherein the third module further comprises a battery located within the third housing.

13. The apparatus of claim 9 wherein said third module is spaced sufficiently from the second module to permit a person's fingers to pass freely between them.

14. The apparatus of claim 11 wherein said third module is spaced sufficiently from the second module to permit a person's fingers to pass freely between them.

15. The apparatus of any of claims 1 through 4 wherein the third housing is a handle for the apparatus.

16. The apparatus of claim 15 wherein a hand grip is molded on the exterior surface of the third housing.

17. The apparatus of claim 15 wherein said third module is spaced sufficiently from the second module to permit a person's fingers to pass freely between them.

18. The apparatus of any of claims 1 through 4 wherein the third module further comprises a battery located within the third housing.

19. The apparatus of any of claims 1 through 4 wherein the third housing is a handle for the apparatus and the center of gravity of the apparatus is located proximate to the third housing.

20. A handheld light scanner apparatus comprising:
a first module comprising a first module base of elongate shape having first and second ends, a housing, means within said housing for projecting a scanned light beam in the direction beyond the first end of the first module base with the central axis of the scanned light beam in generally the same plane as the major axis of the first module base;

means for detecting light from the scanned light beam which has been reflected from scanned objects and producing a first electrical signal representative of the detected light;

a second module comprising data entry means attached to and generally orthogonal to the first module base near the first end thereof; and a third module of elongate shape attached to and generally orthogonal to the first module base near the second end thereof, said third module comprising a handle for the apparatus and being spaced sufficiently from the second module to permit a person's fingers to pass freely between them.

21. The scanner apparatus of claim 20 in which the data entry means of the second module comprises a keyboard.

22. The scanner apparatus of claim 20 in which the second module further comprises a display means.

23. The scanner apparatus of claim 20 in which the second module further comprises display means located on an exterior surface thereof, and further comprises means for rotation of the second module about an axis so that the display means can be turned to face either side of the first module base.

24. The apparatus of claim 23 wherein the second module further comprises a keyboard.

25. The scanner apparatus of claim 20 in which the second module further comprises a keyboard located on an exterior surface thereof, and further comprises means for rotation of the second module about an axis so that the keyboard can be turned to face either side of the first module base.

26. The scanner apparatus of any of claims 23 through 25 wherein the first module further comprises a pair of detent holes in the first module base which are angularly spaced apart by approximately 180°, and the second module is rotatably attached to the first module and further comprises a detent button which interacts with the detent holes so that the second module can be rotated and locked in place at two positions angularly spaced approximately 180° apart.

27. The scanner apparatus of claim 20 in which the second module further comprises data processing means for control of the operation of the scanner apparatus.

28. The scanner apparatus of claim 27 in which the second module further comprises a memory and wherein the data processing means causes the decoding of the first electrical signal into data representative of the symbols scanned, and further causes said data to be stored in the memory.

29. The scanner apparatus of claim 20 in which the second module has a base comprising a data input-output connector.

30. The scanner apparatus of claim 20 further comprising a fourth module generally parallel to the first module base and attached to the second and third modules.

31. The scanner apparatus of claim 20 wherein the first module comprises a generally V-shaped enclosure having a longer, major side and a shorter, minor side, the first module base forming the major side of the V-ape, further comprising a window located between the major and minor sides through which the scanned light beam is projected.

32. The scanner apparatus of claim 31 wherein the means for projecting a scanned light beam is housed within the enclosure portion forming the minor side of the V-shape.

33. The scanner apparatus of claim 20 wherein the third module further comprises a battery enclosure.

34. The scanner apparatus of claim 20 wherein the third module further comprises a rechargeable battery.

35. The apparatus of claim 34 wherein the rechargeable battery is located in the third module so that the rechargeable battery is located adjacent an operator's palm when the operator is normally holding the scanner apparatus.

36. The scanner apparatus of claim 20 wherein the third module further comprises a molded hand grip on the exterior surface of the third module.

37. The scanner apparatus of claim 20 wherein the third module further comprises a three position trigger switch for controlling the means for projecting a scanned light beam.

38. An integrated self-contained noncontact bar code scanner apparatus comprising:
- a scanner module comprising a housing and means located within the housing for projecting a light beam;
- means for detecting light from the light beam reflected from an object and producing a first electrical signal representative of the detected light and the scanned object;
- data processing means for decoding the first electrical signal into digital data representative of the scanned object;
- memory for storing the digital data;
- a data module housing one or more components of the data processing means;
- a battery module for supplying operational power for the apparatus; and
- a frame module comprising a handle for the apparatus and connecting the scanner module, the data module and the battery module into an integrated unit.

39. The apparatus of claim 38 wherein the frame module comprises a generally C-shaped member having a body, a top and a bottom.

40. The apparatus of claim 39 wherein the scanner module is attached to the top of the frame module.

41. The apparatus of claim 39 wherein the battery module is removably attached to the body of the frame module.

42. The apparatus of claim 39 wherein the data module is rotatably attached to and between the top and bottom of the frame module.

43. The apparatus of claim 42 wherein the top of the frame further comprises detent openings and the data module further comprises a detent which locks the data module in either of two positions.

44. The apparatus of claim 39 wherein a portion of the body of the frame module comprises a handgrip.

45. The apparatus of claim 39 wherein the body of the frame further comprises a trigger switch for actuating the apparatus.

46. The apparatus of claim 38 wherein the means for projecting a light beam comprises a laser.

47. The apparatus of claim 38 further comprising means for scanning the light beam.

48. The apparatus of claim 47 wherein the means for projecting a light beam comprises a laser.

49. The apparatus of claim 38 wherein the data processing means further comprises a microprocessor for controlling the operation of the apparatus, said microprocessor being housed in the data module.

50. The apparatus of claim 49 wherein the memory is housed within the data module.

51. The apparatus of claim 50 wherein the memory stores an application program as well as the digital data.

52. The apparatus of claim 38 wherein the data processing means further comprises a display means located on the data module.

53. The apparatus of claim 52 wherein the data processing means further comprises a keyboard located on the data module.

54. The apparatus of claim 38 wherein the data processing means further comprises a keyboard located on the data module.

55. The apparatus of claim 38 wherein the data module further comprises an input/output port for connection to an external apparatus.

56. The apparatus of claim 38 wherein the data module is electrically connected to the scanner module by an electrical interconnecting wire harness which is sufficiently long and flexible to allow the data module to rotate approximately 180°.

57. The apparatus of claim 38 wherein the modules are connected so that the center of gravity of the apparatus is proximate an operator's hand when the operator is holding the apparatus by the frame module.

58. The apparatus of claim 38 wherein the data module housing comprises two housing pieces one of which includes semicircular cutouts in its top and bottom, the frame module includes upper and lower circular collar pieces, and the apparatus further comprises upper and lower clamps having semicircular cutouts, said one housing piece including the semicircular cutouts and the clamps both fitting over the circular collar pieces to provide a system for rotatably connecting the data module to the frame module.

59. The apparatus of claim 38 wherein the frame module and the battery module further comprise opposing contoured surfaces so that the battery module connects to the frame module with a wiping action.

* * * * *

UNITED STATES PATENT AND TRADEMARK OFFICE
CERTIFICATE OF CORRECTION

PATENT NO. : 5,059,778

DATED : October 22, 1991

INVENTOR(S) : Zouzoulas et al.

It is certified that error appears in the above-identified patent and that said Letters Patent is hereby corrected as shown below:

Column 2, line 31, insert --base-- after "module".

Signed and Sealed this

Sixth Day of July, 1993

Attest:

MICHAEL K. KIRK

*Attesting Officer*     *Acting Commissioner of Patents and Trademarks*